Patented Aug. 4, 1953

2,647,897

UNITED STATES PATENT OFFICE 2,647,897

METHOD OF PRODUCING A CRYSTALLINE MIXTURE OF HEXAMETHYLENETETRAMINE THIOCYANIC ACID AND AMMONIUM SULPHATE

Edmund Weidner, Berlin, Germany

No Drawing. Application June 5, 1950, Serial No. 166,302. In Germany December 31, 1948

6 Claims. (Cl. 260—248.5)

This invention relates to a method of producing a crystalline mixture of hexamethylenetetramine thiocyanic acid and ammonium sulphate.

The invention is based on the perception that a mixture of hexamethylenetetramine thiocyanic acid with ammonium sulphate has practically unlimited life, and consists in carrying out the reaction between ammonium thiocyanate with hexamethylenetetramine in organic solvents in the presence of sulphuric acid.

The method of the present invention permits a considerable saving of organic solvents and gives crystals of hexamethylenetetramine thiocyanic acid having practically unlimited durability in air.

It is known to produce concentrated aqueous solutions of hexamethylenetetramine thiocyanic acid ($C_6H_{12}N_4 \cdot HSCN$) by mixing a concentrated aqueous solution of hexamethylenetetramine with the equivalent amount of thiocyanic acid.

It has also been suggested to produce hexamethylenetetramine thiocyanic acid from aqueous solutions of hexamethylenetetramine, ammonium thiocyanate and hydrochloric acid. Apart from the fact that the thiocyanic acid is very easily decomposed in aqueous solution and decomposition readily occurs in a concentration of 6%, in the presence of relatively small amounts of water, it enters into undesirable reactions with hexamethylenetetramine, to which it is fixed in the dry state, with the partial splitting-off of the hexamethylenetetramine. This reaction produces ammonium thiocyanate together with unaltered hexamethylenetetramine and formaldehyde.

This drawback was overcome by fixing the thiocyanic acid to hexamethylenetetramine with the aid of organic solvents, in which the components were dissolved, with extensive elimination of water. The reaction product is precipitated by this method in a pure crystalline form and is less hygroscopic than the salts of thiocyanic acid, for example ammonium thiocyanate. On being stored for a long period hexamethylenetetramine thiocyanic acid (also called hexamethylenetetramine thiocyanate) decomposes to an increasing extent, as soon as it is exposed to atmospheric moisture. The admixture of mineral salts which crystallise free of water of crystallisation from their aqueous solutions, such as sodium and ammonium chloride, increases the durability of the fixed thiocyanic acid.

The present invention starts at this point and is designed to enable hexamethylenetetramine thiocyanic acid of practically unlimited durability to be obtained, if care is taken that the hexamethylenetetramine thiocyanic acid is present in admixture with ammonium sulphate. A crystal mixture of about 66% of hexamethylenetetramine thiocyanic acid and 34% of ammonium sulphate is obtained with a considerable saving of organic solvents, such as methyl or ethyl alcohol, and with a good yield, if about 20% of ammonium thiocyanate is dissolved in them and the equivalent amount of hexamethylenetetramine in powder form is added to the solution and stirred, whereupon only about one-third of the hexamethylenetetramine is dissolved. The reaction takes place by adding in drops the equivalent amount of concentrated sulphuric acid, with constant stirring.

Example

To 76 grams of ammonium thiocyanate dissolved in 340 ccs. of methyl or ethyl alcohol, after the addition of 140 grams of hexamethylenetetramine, are added in drops, with constant stirring, 51.6 grams of $H_2SO_4$ (95%). Yield: about 230 grams containing 19–20% of thiocyanic acid fixed to hexamethylenetetramine and about 33% of ammonium sulphate.

For the next batch use can be made direct of the mother liquors accruing, thus increasing the yields without impairing the quality of the reaction product.

What I claim is:

1. A method of producing a crystalline mixture of hexamethylenetetramine thiocyanic acid and ammonium sulphate by the reaction of ammonium thiocyanate with hexamethylenetetramine in organic solvents which method is characterised in that the reaction is caused to take place in the presence of concentrated sulphuric acid.

2. A method as claimed in claim 1, in which only a part of the hexamethylenetetramine is dissolved in the organic solvents.

3. A method of producing a stable crystalline mixture of hexamethylenetetramine thiocyanic acid and ammonium sulphate comprising mixing ammonium thiocyanate with an organic solvent in an amount insufficient to dissolve completely the ammonium thiocyanate, adding to said incomplete solution hexamethylenetetramine, and subsequently adding concentrated sulphuric acid gradually with constant stirring.

4. A method of producing a stable crystalline mixture of hexamethylenetetramine thiocyanic acid and ammonium sulphate comprising mixing ammonium thiocyanate with an organic solvent in an amount sufficient to dissolve at least about 20 per cent of the ammonium cyanate, adding to said mixture a substantially equivalent amount of hexamethylenetetramine in powder form, and subsequently adding gradually with stirring a substantially equivalent amount of concentrated sulphuric acid.

5. A method of producing a stable crystalline mixture of hexamethylenetetramine thiocyanic acid and ammonium sulphate comprising dissolving ammonium thiocyanate at least partially in a lower aliphatic alcohol, adding hexamethylenetetramine, and subsequently adding gradually with stirring concentrated sulphuric acid in an amount substantially equivalent to the ammonium.

6. A method of producing a stable crystalline mixture of hexamethylenetetramine thiocyanic acid and ammonium sulphate comprising mixing ammonium thiocyanate and hexamethylenetetramine with an organic solvent in an amount insufficient for complete solution, said solvent having little or no dissolving action on hexamethylenetetramine thiocyanic acid and ammonium sulphate, and subsequently adding gradually concentrated sulphuric acid until a solid mixture of hexamethylenetetramine thiocyanic acid and ammonium sulphate has been formed.

EDMUND WEIDNER.

References Cited in the file of this patent

UNITED STATES PATENTS

| Number | Name | Date |
|---|---|---|
| 1,336,709 | Tschunke | Apr. 13, 1920 |

FOREIGN PATENTS

| Number | Country | Date |
|---|---|---|
| 30,047 | Great Britain | of 1913 |
| 351,093 | Great Britain | June 25, 1931 |
| 18,711 | France | Dec. 31, 1913 |
| | (Addition to 466,619) | |

OTHER REFERENCES

Calzolari: Atti della Reale Acod Livcie (5), vol. 21 (1), p. 563–568.